July 17, 1928.
C. L. STANCLIFF
1,677,306
ELECTRIC WELDING TONGS
Filed June 15, 1927
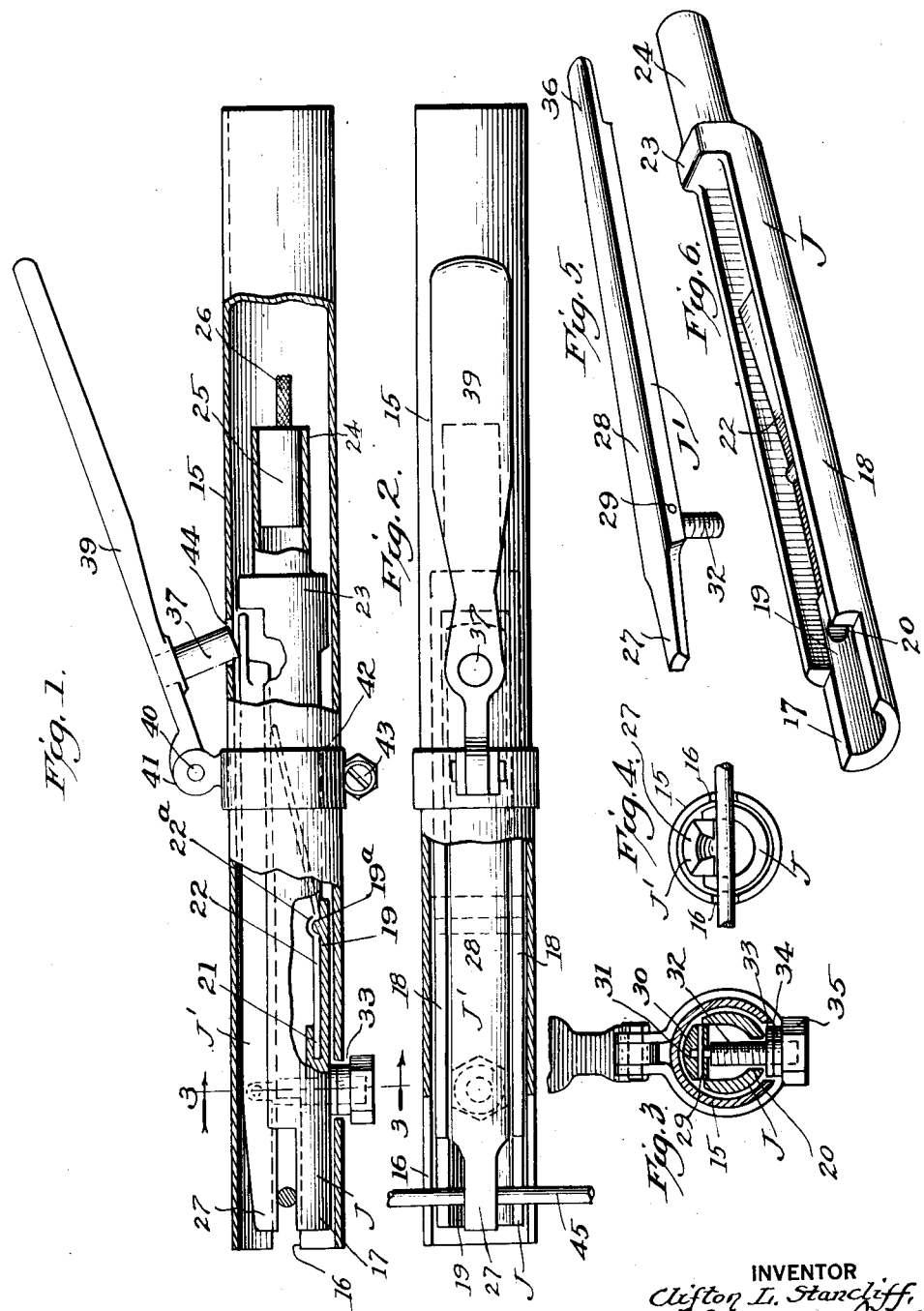
INVENTOR
Clifton L. Stancliff,
BY
ATTORNEY Patented July 17, 1928.

1,677,306

UNITED STATES PATENT OFFICE.

CLIFTON L. STANCLIFF, OF BAKERSFIELD, CALIFORNIA.

ELECTRIC WELDING TONGS.

Application filed June 15, 1927. Serial No. 199,029.

My invention relates to electric welding tongs, and has for its paramount purpose the provision of a pair of tongs so insulated as to prevent arcing except at the welding electrode, whereby the possibility is prevented of accidental arcing such as occurs with tongs as previously constructed when they are carelessly placed on the work being welded, as the operators will frequently do when not actually welding, and thereby resulting in serious injury to the operator.

It is also a purpose of my invention to provide a pair of electric welding tongs which are characterized by their structural simplicity; low cost of manufacture; and adjustability to accommodate and firmly clamp fusing electrodes of different cross sectional dimensions.

I will describe only one form of welding tongs embodying my invention and will then point out the novel features thereof in claims.

In the accompanying drawings:

Fig. 1 is a view showing in side elevation, and partly in section, one form of welding tongs embodying my invention.

Fig. 2 is a view showing the welding tongs in plan and partly in section.

Fig. 3 is a vertical sectional view taken on the line 3—3 of Fig. 1.

Fig. 4 is a view showing the tongs in front end elevation.

Figs. 5 and 6 are detail perspective views of the two jaws embodied in the tongs shown in the preceding views.

Similar reference characters refer to similar parts in each of the several views.

Referring specifically to the drawings my invention, in its present embodiment, comprises a tubular casing 15 formed of suitable insulating material and open at both ends, with the forward end slotted longitudinally at diametrically opposed points as indicated at 16. Insertable into the casing is a stationary jaw designated generally at J and formed of any suitable metal. This jaw comprises a jaw head 17 of arcuate form in cross section projecting from the forward end of an elongated shank made up of parallel spaced members 18 connected at their forward ends by a web 19 provided with an opening 20 and a slot 21 in which latter is received one end of a leaf spring 22. The members 18 are connected at their rear ends by a head 23 provided with a tubular extension 24 in which latter is received a plug 25 (Fig. 1) carrying a conductor 26 by which current is supplied to the instrument.

A movable jaw generally indicated at J' comprises a relatively narrow and tapered jaw head 27 of a width to readily fit between the upstanding portions of the jaw head 17, and an elongated shank 28 on the forward end of which the jaw head 27 is formed. By means of a pin 29 extended transversely through a slot 30 in the shank 28, the flattened end 31 of a screw 32 is pivotally connected to the shank 28. As shown in Fig. 3 this screw 32 extends downwardly through the opening 20 and through an opening 33 in the casing 15 to permit application thereto of a nut 34 provided with a head of insulating material 35. With the screw mounted in this manner it provides a pivotal support for the jaw J' in order that the jaw head 27 can be moved to open or closed position with respect to the jaw 17. The jaw head is normally urged to closed position with respect to the jaw head 17 by means of the spring 22, the latter, as illustrated in Fig. 1, having a flat portion lying contiguous to the web 19, and an upwardly inclined portion engaging the underside of the shank 28 so as to yieldably urge the rear end of the shank upwardly and hence the jaw head 27 downwardly. At the junction of the flat and inclined portions of the spring a raised portion 22ª is formed in the spring for engagement with a rib 19ª on the web 19, the two co-acting to secure the spring in proper position against accidental displacement and to provide a fulcrum point for the spring in its flexing movement. The rear end of the shank 28 terminates in a portion 36 reduced in thickness and against which a stud 37 of insulating material is adapted to bear, the pin being carried by an operating lever 39 pivoted at 40 on a pair of ears 41 of a split collar 42 provided with a screw 43 by which the collar can be brought into clamping engagement with the casing 15. The pin 37 extends through a suitable opening 44 in the casing 15, their opening being of sufficient size to permit the necessary vertical movement of the pin when the lever 39 is operated.

In practice the welding electrode, which in the present instance is shown as a wire 45, may be extended into the slots 16 of the casing for insertion between the jaw heads 17 and 27 in the manner clearly illustrated in Figs. 1, 2 and 4. To insert the electrode it is necessary to depress the lever 39 toward the casing 15 thereby forcing the stud 37 against the rear end of the jaw J' and moving the latter downwardly against the tension of the spring 22, the jaw as a whole rocking about the pin 29 as a center and thereby moving the jaw head 27 to open position. Once the electrode is inserted, the lever 39 can be released, the spring now functioning to return the jaw head to closed position and thereby firmly clamp the electrode between the jaws. With the electrode secured in this manner and current supplied thereto from the plug 25, the tongs can be used in the usual manner to manipulate the electrode in welding, as will be understood by those skilled in the art.

Through the medium of the inuslating casing 15 and stud 37, the operating lever and its mounting are insulated from the jaws J and J', so the possibility of current from the jaws being conducted to the lever or its mounting is prevented. Further, the fact that the casing 15 completely houses the jaws J and J', they are protected against coming into physical contact with extraneous conducting mediums, and consequently the possibility of arcs being produced when placing the tool on a conducting surface is prevented.

The screw 32 can be adjusted by manipulation of the nut 34 to vary the lateral position of the jaw J', and to thus vary the closed position of the jaw head 27 in order that the jaws may accommodate and properly grip electrodes of different diameters. By this adjustment the tongs are capable of receiving and effectively holding electrodes widely varying in cross sectional area.

Although I have herein shown and described only one form of electric welding tongs embodying my invention, it is to be understood that various changes and modifications may be made herein without departing from the spirit of my invention and the spirit and scope of the appended claims.

What I claim is:

1. A pair of welding tongs comprising a casing of insulating material, jaws wholly within the casing, and means exteriorly of the casing and insulated from the jaws for actuating the latter.

2. A pair of welding tongs comprising a casing of insulating material, a stationary jaw wholly within the casing, a movable jaw wholly within the casing, and manually operable means on the outer side of the casing and insulated from the movable jaw for actuating the latter.

3. A pair of welding tongs comprising a casing of insulating material having a slotted and open end, jaws positioned wholly within the casing so that the space between the jaws aligns with the slots to permit the insertion of a welding electrode between the jaws, and means insulated from the jaws for actuating the jaws.

4. A pair of welding tongs comprising a casing of insulating material having a slotted and open end, jaws positioned wholly within the casing so that the space between the jaws aligns with the slots to permit the insertion of a welding electrode between the jaws, and means for actuating the jaws, a portion of said means being disposed exteriorly of the casing and insulated from the jaws.

5. A pair of welding tongs as embodied in claim 2 wherein an adjustable mounting is provided for the movable jaw to vary its open position.

6. A pair of welding tongs comprising a casing of insulating material, a stationary jaw removably fitted in the casing, a movable jaw removably fitted in the casing, a mounting for the movable jaw comprising a member pivotally connected to the movable jaw and extending exteriorly of the casing, and a nut threaded on the member to engage the stationary jaw and by adjustment to actuate the member to vary the position of the movable jaw with respect to the stationary jaw, yieldable means for urging the movable jaw to closed position, and manually operable means disposed exteriorly of the casing for moving the movable jaw to open position and being insulated from the movable jaw.

7. A pair of welding tongs embodied in claim 6 wherein the manually operable means comprises a band clamped to the casing, a lever pivoted on the band, and a stud of insulating material on the lever and engageable with the movable jaw.

8. A pair of welding tongs comprising a casing of insulating material, a stationary jaw removably fitted within the casing and including a jaw head and a shank, a spring secured to the shank, a movable jaw removably fitted within the casing and including a jaw head and a shank engaged by said spring to urge the jaw head to closed position with respect to the stationary jaw head, a threaded member pivotally connected to the movable jaw and extended through the stationary jaw to a point exteriorly of the casing, an insulated nut on the projecting end of the member, a lever pivoted on the casing, and a stud of insulating material carried by the lever and engaging the movable jaw shank to move the movable jaw head to open position upon actuation of the lever.

CLIFTON L. STANCLIFF.